May 7, 1935.  N. DEISCH  2,000,379
METHOD OF AND APPARATUS FOR THE FORMATION OF IMAGES
Filed July 22, 1930   3 Sheets-Sheet 1

Inventor
Noel Deisch

May 7, 1935.  N. DEISCH  2,000,379
METHOD OF AND APPARATUS FOR THE FORMATION OF IMAGES
Filed July 22, 1930   3 Sheets-Sheet 3

Patented May 7, 1935

2,000,379

UNITED STATES PATENT OFFICE 2,000,379

METHOD OF AND APPARATUS FOR THE FORMATION OF IMAGES

Noel Deisch, Washington, D. C., assignor of one-half to Thos. E. Stone, Jr., New York, N. Y.

Application July 22, 1930, Serial No. 469,855

19 Claims. (Cl. 178—6)

The present invention relates to the formation of images, and its general object is to provide improved means for the translation of the electric current analogue of an image into a real image.

Briefly, the apparatus used in the illustrative embodiment of the invention shown in the drawings comprises a composite electro-optic cell the electrodes of which consist of a plurality of linear elements, the two sets of electrode elements intersecting orthogonally to define active areas located at the points of nearest approach of the electrode elements. A commutator connects the electrode elements in cyclic progression to the line carrying the modulated current which excites the electrodes. Polarized light enters obliquely the interspaces between the upper electrode elements, and is reflected back through these interspaces by the lower electrode elements. In its passage the light is modified at a plurality of intersection points by the strained dielectric, the magnitude of the modification depending on the order of the strain at these points, and this modification is detected by means of an analyzer. The dielectric is chosen as one subject to inertia, so that the period of optical strain is prolonged beyond the period of electrical stress. The effect of unequal spectral retardation is overcome by using lights of complementary hues, subjecting these hues separately to stresses producing equal relative retardations in the two beams, and combining the hues to produce white.

Referring to the drawings.

In the transmission of images by the methods of phototelegraphy and television, it is usual to "scan" the image to be transmitted through a succession of coordinate points defining a mosaic, the scanning process consisting essentially in determining the density of the image at a succession of points and restating these density determinations in terms of some characteristic of an electric current. The two dimensional optical image is thus translated into a single dimensional electrical analogue, the variations of the parameters of which analogue in time are coordinate with the variations of density of the scanned image in space. This electric current analogue may be further converted into an electromagnetic disturbance of the Hertzian type. At the station where the image is to be reconstituted, characteristics of successive points along the analogue are translated into approximations of the density of corresponding coordinate points of the original image. It is with this process of re-translating the electric current analogue of an image into a real image that the present invention more particularly deals.

Figure 1:
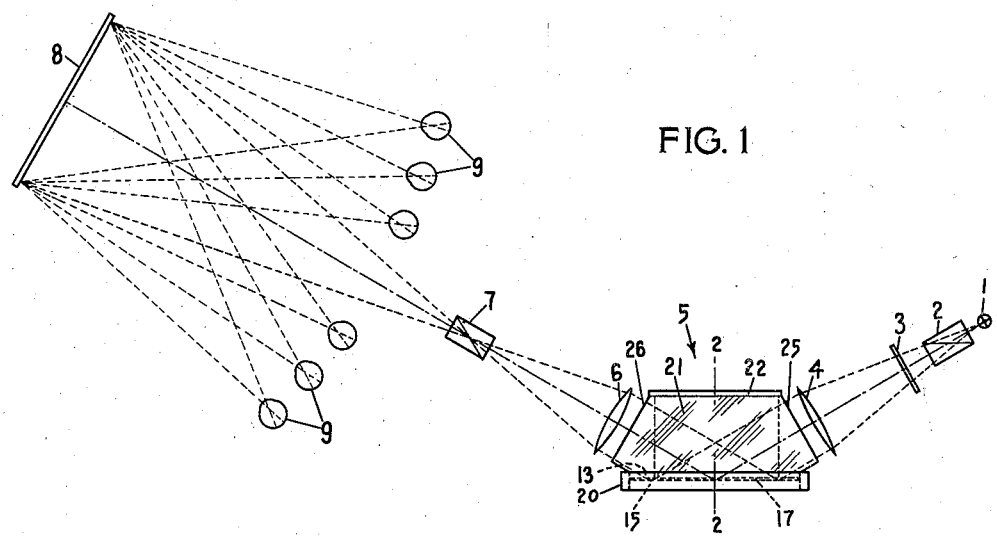
Fig. 1 is a diagram showing the optical arrangement of an image-forming system made according to the present invention.

In Fig. 1 there is shown a projection system comprising a source of radiation 1, a polarizer 2, an absorbing screen 3 adapted to select a preferably restricted region from the spectrum of the radiation emitted by the source 1, a collimating lens 4, an electro-optic cell assembly 5, an imaging lens 6, an analyzer 7, and a diffusing screen 8. The polarizer 2 and the analyzer 7 may consist of Nicol prisms, the construction of which is well known. The Nicol 2 is preferably turned on its longitudinal axis through an azimuth of 45° with respect to a plane passing through the axis of strain existing between the electrodes of the electro-optic cell 5, whereas the principal plane of the analyzer 7 is desirably but not necessarily held orthogonal with this axis of strain.

The electro-optic cell 5 comprises electrodes 10 (Figs. 2 and 3) and 11, each including elements 10a, 10b, 10c, etc., and 11a, 11b, 11c, etc., respectively. The elements 10a, 10b, 10c, etc., of the electrode 10 are linear in character, and in the illustrative case shown are, for a purpose which will presently become apparent, provided with inclined faces 18. These elements are imbedded in V-shaped troughs 12 in the transparent and insulating supporting plate 13. The electrode 10 with its support 13 may be formed by ruling troughs in a glass plate, coating (as by mechanical, chemical, or electrical deposition) a conducting substance such as silver over the surface of the plate, and then removing exposed portions of the metallic coating with a flat tool until the plane of the plate is reached, leaving the electrode portions 10a, 10b, 10c, etc., in the grooves 12.

The electrodes 11a, 11b, 11c, etc., are also linear in character, with preferably plane and specular top surfaces 14, and are held on an insulating and preferably opaque support 15 consisting of a material such as black or deeply stained glass. The electrode assembly 11 with its support may be made by coating a plane slab of a suitable material such as black glass with a thin layer of metal, polishing the metal to a specular surface, and then ruling grooves 16 in the plate, whereby the electrode elements 11a, 11b, 11c, etc., are left. With this method of constructing the electrodes 10 and 11, by which each electrode element is supported throughout its length, it is possible to produce a very compact electrode assembly, the electrode elements of which are held accurately in the desired spatial relation.

Figures 2, 3:
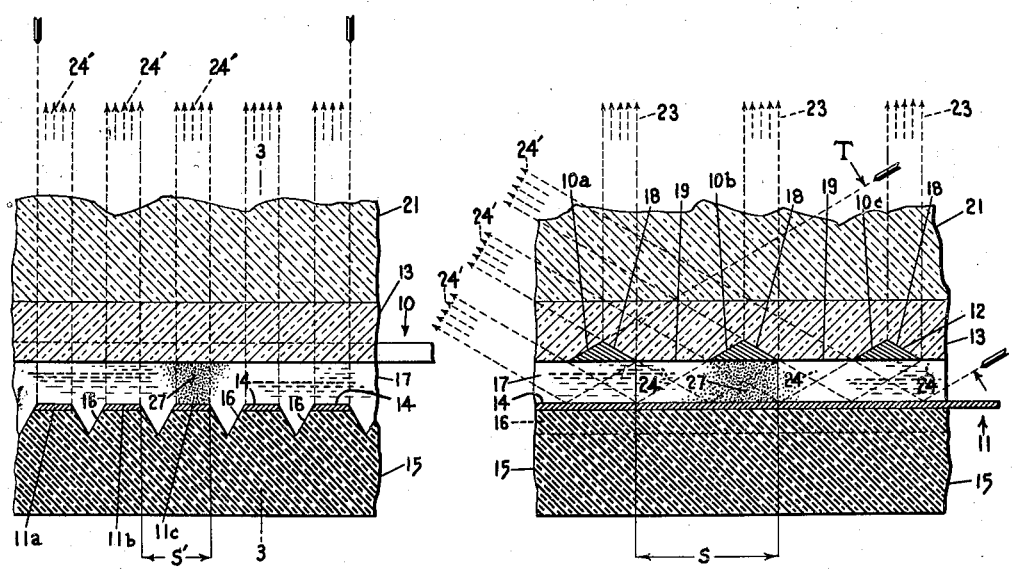
Fig. 2 is an enlarged fragmental section of the electro-optic cell taken on the line 2—2 of Fig. 1, and shows especially the arrangement of the latticed electrodes, their retaining plates, the dielectric, and the path of the incident and emergent light beams.
Fig. 3 is an enlarged fragmental section taken on the line 3—3 of Fig. 2.
Figure 4:
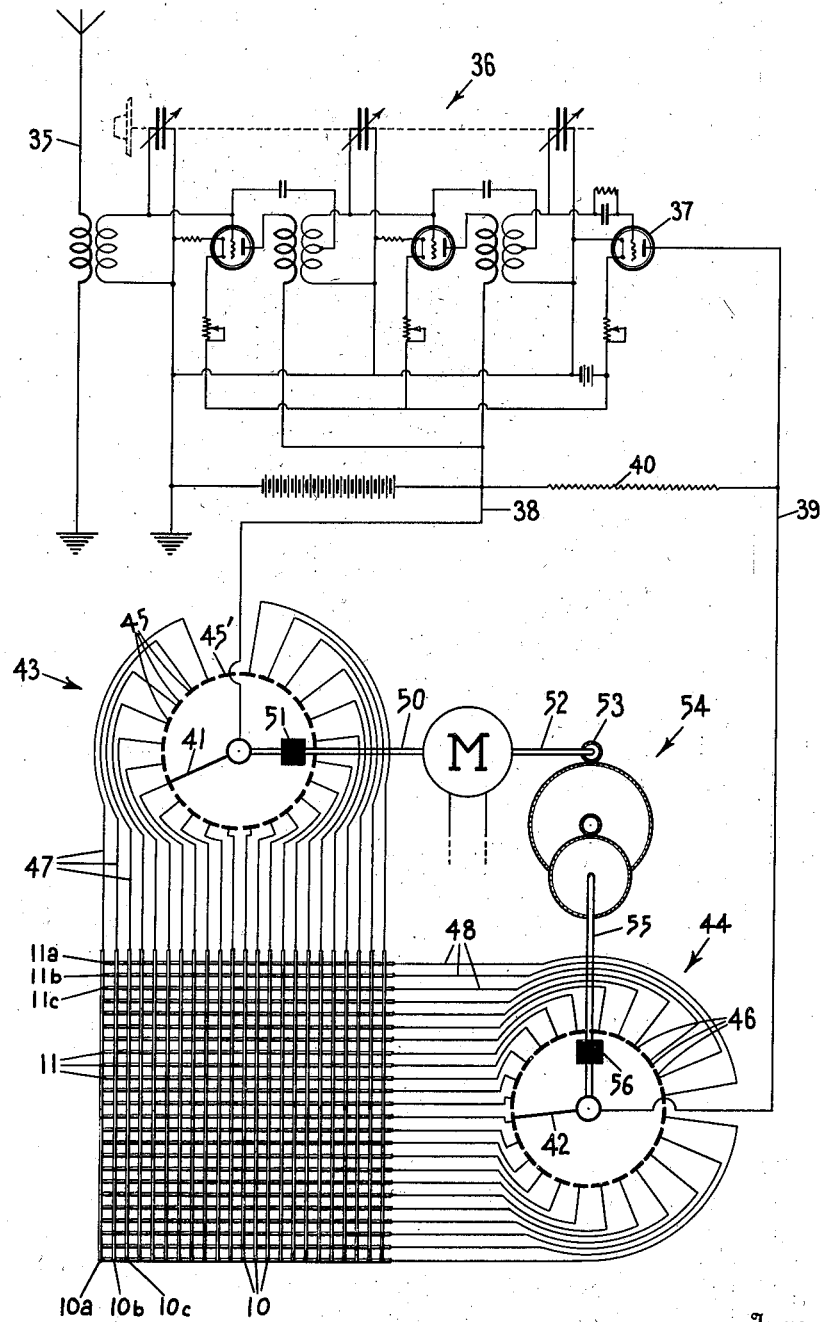
Fig. 4 is an electrical circuit diagram showing the arrangement of the latticed electrodes in the electro-optic cell, the commutator mechanism, and the line connection to an illustrative radio receiving circuit.

The electrode elements 10a, 10b, 10c, etc., and 11a, 11b, 11c, etc., in each of the electrodes are in the illustrative case parallel and coplanar, and the elements in the two sets of electrodes are held mutually perpendicular to each other, as shown in Figs. 2, 3, and 4, in such manner that the electrodes form an intersecting lattice. A plurality of independent electro-optic cells arranged as a mosaic are thus formed at the intersections of the electrode elements. The spacing intervals s, Fig. 3, of the electrode elements 10a, 10b, 10c, etc., is in the illustrative arrangement of the cell preferably made greater than the spacing interval s', Fig. 2, of the electrode elements 11a, 11b, 11c, etc., to compensate the optical foreshortening consequent on an oblique incidence of light.

The space between the electrodes 10 and 11 is filled with an electro-optically active substance 17, which when subjected to electric strain, as by a difference of potential existing between members of the elements 10a, 10b, 10c, etc., and 11a, 11b, 11c, etc., becomes birefringent, according to the well-known Kerr and analogous effects. This dielectric may consist of nitrobenzol, as ordinarily used in electro-optic cells, but, for a purpose that will later be explained, it preferably consists of a substance having a high electro-optic lag, such as one of the higher alcohols, e. g., undecyl alcohol, or a viscous vegetable oil, such as castor oil.

The assembly above described constitutes in effect a composite electro-optic cell, the unit cells, which are arranged as a mosaic, being defined by crossing electrodes, and including the intervening dielectric space. It will be observed that these unit cells are arranged in parallel rows, and that each unit cell is a member of two rows lying along perpendicular directional axes. All of the cells in each row along a certain directional axis have an electrode of one polarity in common, and all of the cells in each row along an axis perpendicular to the first axis have an electrode of opposite polarity in common. The cells have also a common dielectric.

The electrode supports 13 and 15 are held in a frame 20, Fig. 1, which latter maintains the proper separation between the electrodes and serves to prevent escape of the dielectric 17. To prevent surface reflection of light at the otherwise glass-air interface of the electrode support 13, a rhomboidal prism 21, Fig. 1, having plane entering and exit faces 25 and 26 respectively, is cemented to the upper surface of the electrode support 13. An absorbing plate 22, such as a plate of black or deeply colored glass, is cemented to the upper plane face of the prism 21, as shown in Fig. 1.

Light from the source 1 is polarized by the prism 2, and after passage through the filter 3, is collimated into a parallel bundle by the lens 4. It then passes into the prism 21 and the electrode support 13. Referring now to Fig. 3 it will be seen that the incident beam of light, a portion of which is shown as of the width T, falls into the plane of the electrode 10, where portions of the beam strike the inclined faces 18 of the electrode elements 10a, 10b, 10c, etc., and are reflected vertically in narrow parallel bundles 23, which fall upon the roof plate 22 of the cell 5 and are absorbed. Other portions 24 of the beam pass through the interspaces 19 between the electrode elements 10a, 10b, 10c, etc., and fall into the plane of the lower electrode 11. Here portions of the light fall upon the reflecting surfaces 14 of the electrode elements 11a, 11b, 11c, etc., and are reflected back through the interspaces 19 between the electrode elements 10a, 10b, 10c, etc. The intervening portions of the beams 24 fall upon the inclined faces of the grooves 16, by which they become trapped and are caused to be absorbed by the opaque support 15.

The collimated beam entering the cell 5 is hence first divided into a number of thin parallel ribbons of light 24, and these are further divided into a number of separate narrow square pencils of light 24', Figs. 2 and 3. It will be noted that each of the pencils of light 24' passes between a separate intersection of the electrode elements 10a, 10b, 10c, etc., and 11a, 11b, 11c, etc. These pencils emerge from the face 26 of the prism 21, are converged by the lens 6, and pass through the analyzer 7, whence they diverge and fall upon the screen 8, forming a mosaic pattern of square dots analogous to the dots of a half-tone screen. Diffuse reflection here takes place, and the pattern of dots may be observed at points 9. If a permanent record is to be made of the image, the diffusing screen 8 may be replaced by a photographic plate.

By energizing any pair of electrode elements of opposite polarity, such as the element 10b, Fig. 3, and 11c, Fig. 2, the space shown at 27 in Figs. 2 and 3 comprised between the nearest point of approach of these electrodes becomes subject to electric strain, and the dielectric 17 at this area becomes birefringent. As above mentioned the polarizing nicol 2 is preferably oriented at an azimuth of 45° with respect to the plane passing through the axis of electric strain. Thus the plane of polarization of the plane polarized light entering the space between the elements 10b and 11c lies at an azimuth of 45° with respect to the principal axis of the Faraday tubes of force constituting the field between the electrode elements. Due to the birefringence set up in the dielectric, the plane polarized light entering the strained space becomes elliptically polarized, the axes of ellipticity being respectively parallel with and perpendicular to the axis of the tubes of force of the electric field. The pencil of polarized light 24' which traverses this strained space is hence subject to a certain retardation, the order of which with a given dielectric and with a cell of given dimensions is determined by the magnitude of the difference of potential between the two electrodes causing the strain. The principal plane of the analyzing Nicol 7 is, as above stated, preferably held orthogonal to the axis of strain existing between the electrodes of the electro-optic cell 5. It thus lies in one of the axes of ellipticity of the elliptically polarized light constituting the pencils 24'. Under these conditions the quantity of light passing the Nicol 7 is determined by the degree of ellipticity of this light. Since the ellipticity of these pencils changes with the retardation, the transmission of the pencils 24' by the Nicol 7 also changes with the retardation. The particular pencil of polarized light above referred to is hence transmitted in the analyzer 7 in amount dependent on the excitation of the electrodes 10 and 11, and the dot projected on the screen 8 is of a corresponding brightness. The mean or continuous transmission for all of the pencils 24', that is, the transmission when the incoming signal is unmodulated, depends, other conditions being equal, on the permanent or normal electrical bias existing between the electrodes 10 and 11 of the cell 5, since this bias determines the permanent state of ellipticity in the emergent beams 24'. The value of this bias in the circuit shown in Fig. 4 and hereafter to be described, is determined by the relation between the normal static space current passed by the tube 37, and the ohmic value of the resistance 40. With the Nicols 2 and 7 oriented as described above, this bias is preferably but not necessarily chosen to be such that the ratio of the axes of the elliptically polarized light constituting the pencils 24' is infinite, giving plane polarized light. The plane of polarization will be perpendicular to the principal plane of the Nicol 7. With this condition obtaining, and with no modulation active, the Nicol 7 extinguishes the light constituting each of the pencils 24' and the screen 8 is dark. Modulations through a certain value above the level of this bias cause the ellipticity to change through successive values and finally to become infinite in a plane perpendicular to the former plane, again corresponding to plane polarized light, but with the plane of polarization perpendicular to that which first obtained. The light constituting the pencil affected is in this case completely transmitted, since this second plane corresponds with the principal plane of the prism 7. In the normal operation of the apparatus the depth of modulation measuring the extreme highlights and the extreme shadows of the transmitted picture correspond to these two limits.

Although only one pair of intersections of the elements of the electrodes 10 and 11 may be activated by the modulating current at one time, still, for reasons presently to be developed, several or many of the pencils projected on the screen may be affected as to brightness simultaneously. Further, though the individual spots of light which fall on the screen may be rapidly changing in brightness due to modulations, they are fused by the persistence of vision into a homogeneous effect. It is hence apparent that with each of the pencils of light 24 receiving the proper retardation a mosaic picture is produced on the screen 8.

In Fig. 4 is shown the apparatus by which the electrodes 10 and 11 are energized in the process of converting the electrical analogue of the transmitted image into a real image. The incoming analogue, which may for illustrative purposes be assumed to be a modulated carrier wave, is received on the aerial 35. The received signal is selected and amplified in the apparatus 36, which is shown as a radio receiving set of conventional design. The rectified current from the detecting tube 37 creates a difference of potential across the leads 38 and 39, the magnitude of which potential varies according to the modulations of the received signal. A resistance 40 is placed between the leads 38 and 39 to allow of the readjustment of the potential across these leads between successive modulations.

The leads 38 and 39 have connection respectively with the brushes 41 and 42 of the commutators 43 and 44. All but one of the sectors 45 of the commutator 43 has connection through a lead 47 with one of the electrode elements 10a, 10b, 10c, etc., and each of the sectors 46 of the commutator 44 has connection through the leads 48 with one of the electrode elements 11a, 11b, 11c, etc. Means are thus provided for individually and selectively exciting any given pair of opposed electrode elements. In the drawing there are shown 23 of the elements 10a, 10b, 10c, etc., and 24 of the elements 11a, 11b, 11c, etc. These numbers are merely illustrative however, and in a given apparatus it might be desirable to include a much greater number of elements than that shown.

The brush 41 has mechanical connection through the shaft 50 with the motor M, by which it is turned to make connection with the sectors 45 of the commutator 43. An insulating coupling 51 in the shaft 50 serves to localize the electric charge on the brush 41. On a prolongation 52 of the motor shaft 50 is carried the pinion 53, which drives, through the train of reducing gearing 54 and the shaft 55, in which is intercalated the insulating coupling 56, the brush 42. The reduction gearing 54 is shown as having the reduction ratio 24–1; thus the brush 41 of the commutator 43 makes contact with each of the 24 segments of the commutator 43 while the brush 42 is contacting one sector 46 of the commutator 44. It will be noted that a "blind" sector 45' is provided in the commutator 43 which is passed over by the brush 41 during the time the brush 42 is passing between sectors 46 of the commutator 44.

It is important that the time consumed in making a complete cycle of contacts correspond with the time involved in completely scanning the image at the sending station. This is accomplished by running the motor M at a speed such that the brush 42 makes one revolution for each complete scanning of the image.

In the above description illustrative use has been made of a commutator which operates through direct metallic contact. However, other forms of commutator are known, such as those which operate through electromagnetic or electrostatic induction, through conductivity induced by light action, or by the deflection of a cathode beam, and it will be understood that I do not wish to limit myself to the use of the illustrative commutator.

Since each one of the electrode elements of the electrode 11, Fig. 4, remains connected with line 39 during the time that all of the several elements of the electrode 10 are connected in succession with line 38, all of the unit areas located between intersections of the elements of the electrodes 10 and 11 are momentarily excited, according to a periodic succession, the degree of the excitation corresponding to the depth of the modulation of the electric current analogue. Each unit cell of the composite electro-optic cell is thus excited only a fraction of the total time taken to complete a cycle of contacts, and it is hence of advantage that the effects of this excitation be prolonged beyond the period of actual excitation, to the end that the optical retarding power of the excited unit area be prolonged over at least a portion of the period elapsing between successive excitations. This may be achieved by using a dielectric having considerable inertia, that is, one in which the electro-optic strain or effect persists for an appreciable period after the electric stress that produced the strain has subsided. Many such substances are known, and I have indicated above the organic liquids undecyl alcohol and castor oil as being suitable for the purpose, though of course I do not wish to limit myself to the use of these particular materials.

It is well known that in seeking to secure the reproduction of an image by the use of methods which involve the introduction of retardation in a beam of polarized light, as by means of a Kerr cell in which a dielectric is electrically strained to produce birefringence, lights of different wavelengths are subject to different degrees of relative retardation, resulting in a change in spectral composition of the light when the latter is passed through an analyzer. For this reason a polarized beam of white light after passage through such a cell and through its accompanying analyzer is usually brilliantly colored, the exact hue depending on the order of the retardation in the cell. If it be attempted to use white light in securing a directly visual image, using such a cell as an intermediary, the image will be highly colored in a most erratic way. This effect makes it impracticable to use such a cell by ordinary methods for securing a directly visual image. The above effect can be mitigated to some extent by using light of practically one degree of refrangibility for transmission through the cell. In this case the image is uniformly but brilliantly colored, which fact makes the field of application of this method very limited.

To overcome this difficulty I use at least two kinds of light each of different hue in forming a single image. The hues are chosen as complementaries, such as yellow-green and violet, or yellow and indigo, or orange and blue, or red and blue-green, any of which pairs of hues will produce white additively when combined in proper proportion. These polarized lights are separately subjected to proportional retardations to produce equal extinctions when passed through analyzers, and the lights and then combined to produce white.

Figure 5:
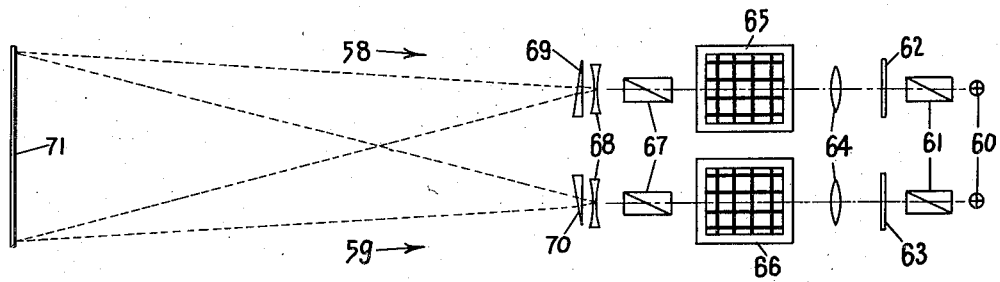
Fig. 5 is a diagram showing the optical arrangement of a projection system in which two separate but coordinate image-forming systems transmitting respectively lights of complementary hues, are used to nullify the effect of unequal retardation in the electro-optic cells.

Fig. 5 makes clear the optical arrangement by which this method of working is carried into practice. The apparatus includes two separate but associated optical systems 58 and 59, having similar parts, consisting of sources 60, polarizers 61, filters 62 and 63, collimators 64, electro-optic cell assemblies 65 and 66 which may be of the type shown at 5 in Fig. 1, analyzers 67, diverging lenses 68, deflecting prisms 69 and 70, and a diffusing screen 71. The color screen 62 is made to pass a preferably narrow band of radiation of one complementary hue, say red, and the other is such as will pass a preferably narrow band of radiation of a second complementary hue, blue-green. The prisms 69 and 70 are arranged to bend their respective beams obliquely toward the centre of the screen to secure substantial coincidence of the mosaic patterns formed in the two cells 65 and 66: by this means the lights of corresponding coordinates of the two patterns are united to produce white. Many methods of uniting two or more images have been developed in connection with the art of color photography, and the inventor does not intend to restrict himself to the use of the method of superposing the two images here shown, this method being merely illustrative.

One method by which the correct degree of retardation may be had in each of the cells 65 and 66, when each of these cells is energized equally by modulating current, as by means such as shown in Fig. 4, is that of using a dielectric of such Kerr constant in each cell that the proper retardations are obtained for each color used. Dielectrics of a wide range of sensibility can be readily prepared by mixing in various proportions two mutually miscible dielectric liquids of different Kerr constants, such as nitrobenzol with a Kerr constant of $256 \times 10^{-7}$ and benzol with a Kerr constant $0.6 \times 10^{-7}$. Assume that the cell 65 transmits orange and is filled with a dielectric consisting of nitrobenzol. The cell 66 transmits blue, which requires smaller birefringence to induce a given proportional retardation; it will hence be filled with a certain dilution of nitrobenzol. The proper dilution for a given assembly may be determined by computation, or empirically by using successively greater dilutions until the proper mixture is had.

Figure 6:
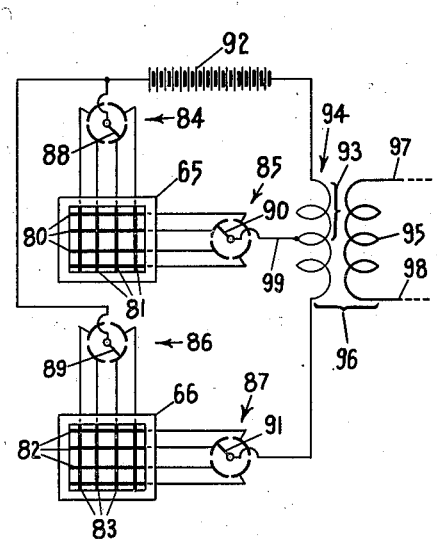
Fig. 6 is an electrical circuit diagram of an image-forming system the optical diagram of which is shown in Fig. 5, and indicates the method by which the inductive strain acting between the electrodes of the one cell is made to be greater than that acting within the other cell.
Figure 7:
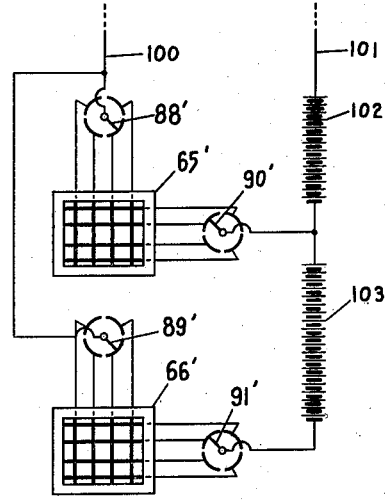
Fig. 7 is a diagram corresponding to Fig. 6 but showing a modification in which the electro-optic cells are differently biased.

Two electrical methods are shown in Figs. 6 and 7, respectively, by which the cells 65 and 66 can be made to produce proportional retardations even when both of these cells contain a dielectric of the same composition. Referring to Fig. 6, it will be seen that the elements 80 of the electro-optic cell 65 have connection with the segments of the commutator 85, and the elements 81 of the cell 65 have connection with the segments of the commutator 84, substantially as described in connection with Fig. 4. Likewise the elements 83 of the electro-optic cell 66 have connection with the segments of the commutator 86 and the elements 82 have connection with the segments of the commutator 87. The brushes 88 and 89 have common connection to one pole of the battery 92. The brush 90 has connection through the lead 99 and the portion 93 of the secondary 94 of the mututal inductance coil 96 with the opposite pole of the battery 92, whereas the brush 91 has connection through the entire length of the secondary 94 of the inductance coil 96 with the battery 92. The brushes 88 and 89, and the brushes 90 and 91, are rotated uniformly and conjointly, by means such as those shown in Fig. 4. The terminals 97 and 98 of the primary 95 of the mutual inductance 96 receive the modulated current representing the analogue of the image to be reproduced; these leads may correspond to the leads 38 and 39 of Fig. 4. The function of the battery 92 is to bias the electrodes of the electro-optic cells 65 and 66, thus giving them added sensibility to impulses that may be superposed on this bias.

An impulse in the leads 97 and 98 sets up a field in the primary winding of the mutual inductance coil 96 a portion of the energy of which is transferred to the secondary winding 94, in which it sets up a difference of potential. Due to the point of insertion of the lead 99 into the convolutions of the coil 94, only a portion of the total difference of potential set up in this coil is impressed across the electrodes 80 and 81. This electrical stress results in a corresponding degree of birefringence being set up in the electro-optic cell 65, which transmits light of a certain color, say blue-green. However the full difference of potential induced in the secondary 94 is impressed on the electrodes of the electro-optic cell 66, to set up a birefringence of corresponding value in the dielectric of this cell, which transmits a certain other color, say red. By choosing proper values for the inductances 93 and 94, the degrees of birefringence set up in the two cells may be made to suit the particular set of light complementaries employed.

In the modification shown in Fig. 7, the brush 88' of the cell 65', and the brush 89' of the cell 66' are connected to the lead 100. The brush 90' of the cell 65' has connection through the battery 102 to the lead 101, and the brush 91' of the cell 66' has connection through the batteries 103 and 102 to the lead 101. The terminals 100 and 101 may correspond to the leads 38 and 39, Fig. 4. Impulses across these leads become incident on the electrodes of the cells 65' and 66' through their respective brushes and commutators. The cell 65' receives a certain bias from the battery 102, whereas the cell 66' receives a bias due to the combined action of the batteries 102 and 103. The cell 66' has therefore a greater inherent sensibility to electric impulses than the cell 65'. By properly choosing the values of the biases impressed on the cells 65' and 66', the degrees of birefringence set up in the two cells may be made to suit the particular set of light complementaries employed.

It is well known that the visual effect corresponding to white may be produced by the admixture of three or more hues, and though I have for convenience shown the use of but two hues in the above description, I do not desire to be limited to this number.

While I have described my invention with respect to the preferred form thereof, I reserve the right to make such changes in the details of construction or such substitution of equivalents as conform to the spirit of the invention or fall within its scope as defined by the appended claims. It is moreover not indispensable that all features of the invention be used conjointly, as they may be advantageously employed in various combinations or subcombinations.

I claim:

1. In an apparatus for the formation of images from an electric current analogue, an electro-optic cell comprising a composite electrode including a plurality of electrode elements separated by interspaces, a second and reflecting electrode having its reflecting face directed toward said composite electrode, a birefringent member placed between said composite electrodes and said reflecting electrode, and means to pass polarized light through the interspaces in said composite electrode, through said birefringent member, and on to said reflecting electrode, whereby the plane of polarization of said light is rotated, and said light is reflected back through the interspaces of said composite electrode.

2. An apparatus for the formation of images from an electric current analogue comprising a Kerr cell having a plurality of parallel linear electrodes defining one coordinate of a plane image, a plurality of parallel linear electrodes one side of which constitutes a reflecting member, said electrodes being arranged at an angle with said first linear electrodes defining a second coordinate of a plane image, the axes of said two sets of electrodes lying in different but substantially parallel planes, a birefringent member between said electrodes, and means for progressively subjecting members of said electrodes to a difference of potential corresponding to modulations in said electric current analogue whereby the medium between said electrodes is subjected to an electric stress and becomes birefringent.

3. In apparatus for converting an electric analogue of an image into a real image, a composite electro-optic cell involving a plurality of unit electro-optic cells arranged in rows paralleling different directional axes, each of said cells including opposite spaced electrodes having a birefringent member therebetween each cell a member of at least two rows lying on different directional axes, independently energizable conductors connecting an electrode of all cells in each row parallel to one directional axis, independently energizable conductors connecting a different electrode of all cells in each row parallel to another directional axis, the connections made by said conductors being respectively in the directions of the two respective axes, means to pass polarized light through said cells, and means to convert changes of polarization of said light effected by said cells into corresponding changes of brightness.

4. In apparatus for converting an electric analogue of an image into a real image, a composite Kerr cell involving a plurality of unit Kerr cells having a common dielectric, said cells arranged in rows having different axes of symmetry, all the cells in each row along one axis of symmetry having an electrode of one polarity in common, all the cells in each row along another axis of symmetry having an electrode of another polarity in common, means to pass polarized light through said cell, and means to convert changes of polarization of said light effected by said cell into corresponding changes of brightness.

5. In apparatus for converting an electric analogue of an image into a real image, an electro-optic cell comprising a composite electrode including a plurality of spaced elements, a second and reflecting electrode adapted to co-act with said first electrode and to reflect light back through the interspaces of said first electrode, a birefringent member between said electrodes for rotating the plane of polarized light, and means for passing a beam of polarized light through the interspaces of said first electrode to form nonparallel incident and reflected beams the included angle of said beams being subtended by the centres of adjacent interspaces, whereby the reflected beams are not occulted by the elements of said first electrode.

6. In apparatus for converting an electric analogue of an image into a real image, an electro-optic cell comprising a composite electrode including a plurality of spaced elements, a second and reflecting electrode adapted to co-act with said first electrode and to reflect light back through the interspaces of said first electrode, a birefringent member between said electrodes for rotating the plane of polarized light, and means to pass a beam of polarized light through the interspaces of said first electrode at an angle to the plane of said first electrode, said angle being substantially equal to the complement of half the included angle defined by said interspaces of said first electrode as measured from a point located on said reflecting electrode midway between said interspaces, whereby light entering through each interspace is reflected back through an adjacent interspace.

7. In apparatus for translating the electric current analogue of an image into a real image, said apparatus including electro-optic cells adapted to change the retardation of light transmitted by said cells, the method of balancing the effects of unequal spectral retardation produced in such cells which consists in using more than one light component, said components being respectively of such spectral character that on fusion they produce white, passing each of said components through separate cells which produce equal relative retardation, and uniting said components.

8. An apparatus for the formation of images comprising a Kerr cell having a plurality of separated electrodes including members arranged transversely of and in proximity to other members thereof to define restricted areas of opposition, the axes of said transversely arranged members lying in different parallel planes, a birefringent dielectric in the interstitial space between said opposed electrodes, means for passing a beam of polarized light through said birefringent dielectric, and means for impressing different potentials across selected electrodes in sequence and in timed relationship.

9. An apparatus for the formation of images comprising a Kerr cell having a plurality of electrodes including cathode and anode elements, said cathode elements lying transversely of and being separated from said anode elements, the axes of said cathode elements lying in a plane separated from but parallel with the plane containing the axes of said anode elements, a birefringent dielectric in the space intervening between said cathode and anode elements, the electrode elements on one side of said birefringent dielectric having specular surfaces facing the electrodes on the other side of said birefringent dielectric means for passing a beam of light between some of said electrodes and through said birefringent dielectric, a polarizer disposed in said beam before it enters said cell, means for impressing different potentials across selected anode and cathode elements in sequence and in timed relationship, and means including an analyzer disposed in said beam after it emerges from said cell to convert the modifications of polarization sustained by said light in its passage through said dielectric into a visible effect.

10. In apparatus for the formation of images, a Kerr cell comprising a composite electrode including a plurality of spaced elements, means to pass light obliquely between the elements of said electrode, said elements having specular faces to reflect away portions of the incident light which do not pass between said elements, a second composite electrode including a plurality of spaced elements having specular faces to return light which has passed between the elements of said first electrode back through the elements of said first electrode, and a birefringent member between the electrodes.

11. In television receiving apparatus, means to convert an electromagnetic wave analogue of an image into the electric current analogue of said image, image forming means including a Kerr cell comprising a plurality of electrodes including cathode and anode elements, the axes of said cathode elements lying in a different parallel plane from and crossing said anode elements, a birefringent dielectric separating said anode elements from said cathode elements, the electrodes on one side of said birefringent dielectric having reflecting faces in opposition to the electrodes on the other side of said birefringent dielectric and means including a commutator to impress different portions in point of time of said electric current analogue on to different electrodes of said Kerr cell.

12. Television apparatus including a radio receiving circuit for converting an ether wave analogue of an image into the electric current analogue of said image, output leads from said receiving circuit, a composite electro-optic cell involving a plurality of unit Kerr cells arranged in rows paralleling different directional axes, each of said cells comprising two electrodes separated by a birefringent member, each cell a member of at least two rows lying on different directional axes, conductors connecting all cells in each row parallel to one directional axis, said conductors being electrically insulated the one from the other, means for selectively placing said conductors in electrical connection with one of said output leads, conductors connecting all cells in each row parallel to another directional axis, said conductors being electrically insulated the one from the other, and means for selectively placing said conductors in electrical connection with another of said output leads.

13. An apparatus for the formation of images from an electric current analogue including a Kerr cell having electrode elements arranged in sets, said electrodes being disposed so that the elements of distinct sets intersect each other, and a birefringent member in the interstitial space defined by said intersections of said electrodes said birefringent member consisting of a higher alcohol such as undecyl alcohol.

14. An apparatus for the formation of images from an electric current analogue including a Kerr cell having electrode elements arranged in sets, said electrodes being disposed so that the elements of distinct sets intersect each other, and a birefringent member in the interstitial space defined by said intersections of said electrodes, said birefringent members consisting of castor oil.

15. An apparatus for converting the electric current analogue of an image having portions corresponding to greater and lesser light intensity into a substantially colorless real image, said apparatus including means to produce separate beams of light of complementary colors, means to polarize each of said beams of light, a Kerr cell for each of said beams to simultaneously change the plane of polarization of said beams of polarized light through different angles of azimuth responsive to portions of said analogue corresponding to different light intensities, the absolute rotatory power of said cells as measured by monochromatic radiation being lesser in the cell transmitting the color of shorter wave-length, and greater in the cell transmitting the complementary color of greater wave-length, whereby the angles of rotation in the separate complementary beams are equal for portions of said analogue corresponding to a given image density and the intensity ratio of the two beams remains constant for all degrees of light transmission, analyzers to convey said azimuth changes into corresponding intensity changes in said beam, and means to unite said beams to produce a single visual effect.

16. An apparatus for converting the electric current analogue of an image having portions corresponding to greater and less light intensity into a substantially colorless real image, said apparatus including means to produce separate beams of light of complementary colors, means to polarize each of said beams of light, a Kerr cell for each of said beams to simultaneously change the plane of polarization of said beams of polarized light through different angles of azimuth responsive to portions of said analogue corresponding to different light intensities, the birefringent member within the cell transmitting the beam of shorter wave length having a lower Kerr constant than the birefringent member within the cell transmitting the beam of longer wave length, whereby the angles of rotation in the separate complementary beams are equal for portions of said analogue corresponding to a given image density and the intensity ratio of the two beams remains constant for all degrees of light transmission, analyzers to convey said azimuth changes into corresponding intensity changes in said beams, and means to unite said beams to produce a single visual effect.

17. An apparatus for converting the electric current analogue of an image having portions corresponding to greater and lesser light intensity into a substantially colorless real image, said apparatus including means to produce separate beams of light of complementary colors, means to polarize each of said beams of light, a Kerr cell for each of said beams to simultaneously change the plane of polarization of said beams of polarized light through different angles of azimuth responsive to portions of said analogue corresponding to different light intensities, means to produce differences of potential between the electrodes of said cells, said means being responsive to changes in said analogue, the cell transmitting the beam of shorter wave length having a smaller difference of potential impressed upon its electrodes than the cell transmitting the beam of higher wave length, whereby the angles of rotation in the separate complementary beams are equal for portions of said analogue corresponding to a given image density and the intensity ratio of the two beams remains constant for all degrees of light transmission, analyzers to convert said azimuth changes into corresponding intensity changes in said beams, and means to unite said beams to produce a single visual effect.

18. An apparatus for converting the electric current analogue of an image having portions corresponding to greater and lesser light intensity into a substantially colorless real image, said apparatus including means to produce separate beams of light of complementary colors, means to polarize each of said beams of light, a Kerr cell for each of said beams to simultaneously change the plane of polarization of said beams of polarized light through different angles of azimuth responsive to portions of said analogue corresponding to different light intensities, a source of electromotive force to maintain a higher difference of potential across the electrodes of the cell transmitting the beam of longer wave length than concurrently exists across the electrodes of the cell transmitting the beam of shorter wave length, whereby the angles of rotation in the separate complementary beams are equal for portions of said analogue corresponding to a given image density and the intensity ratio of the two beams remains constant for all degrees of light transmission, analyzers to convert said azimuth changes into corresponding intensity changes in said beams, and means to unite said beams to produce a single visual effect.

19. The method of translating the electric current analogue of an image into a substantially colorless real image which consists in producing two beams of polarized light of complementary color, subjecting said beams of light separately to a retarding action in a Kerr cell, applying a potential to the cell that passes the beam of longer wave length in order to subject both beams to equal relative retardation and uniting said beams.

NOEL DEISCH.